United States Patent
Andre et al.

(10) Patent No.: US 7,268,199 B2
(45) Date of Patent: Sep. 11, 2007

(54) USE OF ALKOXYLATED POLYVINYL AMINES FOR THE MODIFICATION OF SURFACES

(75) Inventors: Valerie Andre, Ludwigshafen (DE); Werner Bertleff, Viernheim (DE); Oliver Borzyk, Speyer (DE); Juergen Huff, Ludwigshafen (DE); Ralf Noerenberg, Buettelborn (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 576 days.

(21) Appl. No.: 10/297,577

(22) PCT Filed: Jun. 13, 2001

(86) PCT No.: PCT/EP01/06718

§ 371 (c)(1),
(2), (4) Date: Dec. 12, 2002

(87) PCT Pub. No.: WO01/96453

PCT Pub. Date: Dec. 20, 2001

(65) Prior Publication Data

US 2003/0143908 A1    Jul. 31, 2003

(30) Foreign Application Priority Data

Jun. 13, 2000   (DE) ............................... 100 29 027

(51) Int. Cl.
*C08L 39/02*  (2006.01)
*B32B 27/30*  (2006.01)

(52) U.S. Cl. .............................. 526/307.3; 526/307.4; 442/173; 442/118; 442/164

(58) Field of Classification Search ............ 428/423.1; 442/118, 164, 173; 526/307.3, 307.4
See application file for complete search history.

(56) References Cited

U.S. PATENT DOCUMENTS 6,057,404 A * 5/2000 Utecht et al. ............. 525/328.2

FOREIGN PATENT DOCUMENTS

| EP | 0 111 984 | 6/1984 |
|---|---|---|
| GB | 2 297 503 | 8/1996 |
| WO | 97 00351 | 1/1997 |
| WO | 98 27263 | 6/1998 |
| WO | 99 55742 | 11/1999 |

* cited by examiner

*Primary Examiner*—Thao Tran
(74) *Attorney, Agent, or Firm*—Oblon, Spivak, McClelland, Maier & Neustadt, P.C.

(57) ABSTRACT

The present invention relates to the modification of surface properties of particulate, linear, sheet-like, or three-dimensional structures using alkoxylated polyvinylamines. The invention further relates to novel alkoxylated polyvinylamines, and also to a process for their preparation.

12 Claims, No Drawings

USE OF ALKOXYLATED POLYVINYL AMINES FOR THE MODIFICATION OF SURFACES

BACKGROUND OF THE INVENTION

1. Field of the Invention

The present invention relates to the modification of surface properties of particulate, linear, sheet-like, or three-dimensional structures, using alkoxylated polyvinylamines. The invention further relates to novel alkoxylated polyvinylamines, and also to a process for their preparation.

2. Description of the Background

Articles made from synthetic materials, such as thermosets or thermoplastics, generally have hydrophobic surface properties. However, hydrophobic properties are frequently undesirable if adhesive, or a coating or ink or paint or lacquer, is to be applied to the articles, since most adhesives, coating compositions, and paints give only inadequate adhesion to hydrophobic surfaces. Hydrophobic properties are also undesirable in textile sheets, in particular in nonwovens. Examples of uses of nonwovens are cloths for cleaning, wiping or dishwashing, and serviettes. In these applications it is important that when spilled liquids, for example, such as milk, coffee, etc. are wiped up they are rapidly and fully absorbed, and that wet surfaces are dried as fully as possible. The absorption of liquids by a cleaning cloth becomes more rapid as their transport on the fiber surface becomes faster, and fibers with a hydrophilic surface are readily and rapidly wetted by aqueous liquids.

There are various conventional processes for hydrophilicizing the surfaces of films or moldings. For example, the surfaces of plastic articles can be activated by gaseous fluorine. However, this process requires operations using the highly poisonous gas fluorine, with increased apparatus costs. Corona and plasma treatments are other processes used to increase the hydrophilic character of the surface of various materials, such as plastics or metals.

To improve the water-absorption properties of nonwovens, use is also made of surface-active hydrophilicizing agents, such as emulsifiers, surfactants, or wetting agents. These give excellent initial hydrophilic properties. However, a disadvantage of these nonwovens is that the hydrophilic agents are gradually washed out by water or other aqueous media.

After repeated contact with water, the product becomes increasingly hydrophobic. Another disadvantage of the known surface-active agents is a marked reduction in the surface tension of water so that in many applications, in particular in nonwovens used for sanitary or diaper applications, there is an undesirable increase in the susceptibility to permeation and in the wetting power of the liquid absorbed.

WO 98/27263 discloses stably hydrophilic polymer coatings for fibers made from polyester or from polypropylene or the like. The coating comprises certain polyoxypropylamines or polypropylene oxide polymers or hydrophilic polyester copolymers containing ethylene terephthalate units.

WO 97/00351 describes durably hydrophilic polymer coatings for polyester fibers, polyethylene fibers, or polypropylene fibers, and for the corresponding woven fabrics. The coatings comprise hydrophilic copolyesters, and also polypropylene oxide polymers.

SUMMARY OF THE INVENTION

It is an object of the present invention to provide hydrophilicized particulate, linear, sheet-like, or three-dimensional structures, and also a process for increasing the level of hydrophilic properties on surfaces of structures of this type.

We have found that this object is achieved, surprisingly, by way of alkoxylated polyvinylamines whose amino nitrogen atoms have side chains derived from oxiranes.

The present invention therefore provides a particulate, linear, sheet-like, or three-dimensional structure comprising, at least on its surface, a hydrophilicizing amount of at least one alkoxylated polyvinylamine, where at least some of the polyvinylamine nitrogen atoms bear side chains of the formula I:

$$-(CH_2-CR^1R^2-O)_m-(CH_2-CHR^3-O)_nH \qquad (I)$$

where $R^1$, $R^2$, $R^3$, m, and n are as follows:
$R^1$ is $C_2$-$C_{28}$-alkyl, $C_2$-$C_{28}$-alkenyl, $C_6$-$C_{16}$-aryl, or $C_7$-$C_{16}$-arylalkyl,
$R^2$ is hydrogen or methyl, in particular hydrogen,
$R^3$ is hydrogen or methyl,
m is an integer from 1 to 20, and
n is 0 or an integer from 1 to 100.

DETAILED DESCRIPTION OF THE PREFERRED EMBODIMENTS

Particulate structures are in particular those with a particle size of from 1 nm to 10 mm, in particular from 10 nm to 1 mm, which are preferably dispersed or dispersible in a medium. Examples which may be mentioned are pigments, mineral or metallic fillers, and nonliving organic materials.

Linear structures are particularly fibers, filaments, yarns, threads, and the like. Structures of this type are also termed linear textile structures.

Linear textile structures in the context of the present application also include textile composites, e.g. carpets, bonded textiles, laminated textiles, etc.

For the purposes of the present invention, sheet-like structures are particularly textile structures, such as wovens, knits, felts, webs, or nonwovens, preferably the latter. A nonwoven is produced by laying down a web of fibers which is then consolidated by various processes to give nonwovens. For example, the web is treated with an aqueous binder, such as a polymer latex, and then, where appropriate after removal of excess binder, dried and, where appropriate, cured. Other sheet-like structures are films, paper, and comparable two-dimensional structures.

Three-dimensional structures are generally moldings of various dimensions. They include in particular moldings made from wood, from paper, from metals, from plastics, from ceramic substrates, and from woven fabrics composed of natural or synthetic fibers in the form of fluffs, tissues, etc.

Preferred embodiments of the structure of the invention are linear or sheet-like textile structures. Other preferred embodiments of the structure of the invention are plastic films and plastic moldings.

Here and hereinafter, $C_2$-$C_{28}$-alkyl is linear or branched alkyl having from 2 to 28 carbon atoms, e.g. ethyl, n-propyl, isopropyl, n-butyl, 1-methylpropyl, 2-methylpropyl, 1,1-dimethylethyl, n-pentyl, 1-methylbutyl, 2-methylbutyl, 3-methylbutyl, n-hexyl, n-octyl, ethylhexyl, 1,1,3,3-tetramethylbutyl, n-nonyl, n-decyl, n-undecyl, n-dodecyl, n-tridecyl, myristyl, pentadecyl, palmityl (=cetyl), heptadecyl, octadecyl, nonadecyl, arachinyl, behenyl, lignocerenyl, cerotinyl, melissinyl, etc. Among these, preference is given to linear or branched radicals having from 2 to 8 carbon atoms, in particular from 2 to 6 carbon atoms.

Correspondingly, $C_2$-$C_{28}$-alkenyl is linear or branched alkyl having from 2 to 28 carbon atoms and having one, two, or three double bonds, which may be conjugated or unconjugated. Examples of these are vinyl, allyl, 1-methylvinyl, methallyl, 1-butenyl, octenyl, nonenyl, decenyl, undecenyl, dodecenyl, tridecenyl, tetradecenyl, pentadecenyl, hexadecenyl, heptadecenyl, octadecenyl, nonadecenyl, linolyl, linolenyl, elaostearyl, etc. Among these, preference is given to linear or branched radicals having from 2 to 8 carbon atoms, in particular from 2 to 6 carbon atoms.

$C_6$-$C_{16}$-Aryl is an aromatic radical having from 6 to 16 carbon atoms, e.g. phenyl or naphthyl, with or without substitution, e.g. with one, two or three substituents selected from among halogen, $C_1$-$C_4$-alkyl, e.g. methyl or ethyl, and $C_1$-$C_4$-alkoxy, e.g. methoxy or ethoxy.

$C_7$-$C_{16}$-Arylalkyl is alkyl having preferably 1, 2, 3, or 4 carbon atoms and bearing an aromatic radical having from 6 to 16 carbon atoms, as defined above. Examples here are benzyl, 1-phenylethyl, and 2-phenylethyl.

The alkoxylated polyvinylamines used according to the invention derive from polyvinylamines.

For the purposes of the present invention, polyvinylamines are polymers built up to some extent or entirely from repeat units formally derived from N-vinylamine or from an N-alkyl-N-vinylamine. These polymers can be obtained by copolymerizing open-chain N-vinylcarboxamides A, alone or together with other monoethylenically unsaturated comonomers B, and then using acids, bases, or enzymes to eliminate the formyl or alkylcarbonyl group from the open-chain N-vinylcarboxamide units incorporated into the polymer, to form vinylamine units. Polyvinylamines are known, cf. U.S. Pat. No. 4,217,214, EP-A-0 071 050 and EP-A-0 216 387, for example.

Examples of open-chain N-vinylcarboxamides A are: N-vinylformamide, N-vinyl-N-methylformamide, N-vinylacetamide, N-vinyl-N-methylacetamide, N-vinyl-N-ethylacetamide, N-vinyl-N-methylpropionamide, and N-vinylpropionamide. To prepare the polyvinylamines, the monomers mentioned may be polymerized either alone, in a mixture with one another, or together with other monoethylenically unsaturated monomers.

The polyvinylamine is preferably one derived from polymers of N-vinylformamide.

Suitable comonomers B are monoethylenically unsaturated monomers, in particular vinyl esters of saturated carboxylic acids having from 1 to 6 carbon atoms, such as vinyl formate, vinyl acetate, vinyl propionate, and vinyl butyrate. Other suitable comonomers B are ethylenically unsaturated $C_3$-$C_6$ carboxylic acids, such as acrylic acid, methacrylic acid, maleic acid, crotonic acid, itaconic acid, and vinylacetic acid, and also the corresponding alkali metal and alkaline earth metal salts, esters, amides, and nitriles, for example methyl acrylate, methyl methacrylate, ethyl acrylate, and ethyl methacrylate. Other suitable comonomers are esters of ethylenically unsaturated carboxylic acids with amino alcohols, for example dimethylaminoethyl acrylate, dimethylaminoethyl methacrylate, diethylaminoethyl acrylate, diethylaminomethyl methacrylate, dimethylaminopropyl acrylate, dimethylaminopropyl methacrylate, diethylaminopropyl acrylate, dimethylaminobutyl acrylate, and diethylaminobutyl acrylate, the amides of ethylenically unsaturated carboxylic acids, for example acrylamide, methacrylamide, N-methylacrylamide, N,N-dimethylacrylamide, N-methylmethacrylamide, N-ethylacrylamide, N-propylacrylamide, and tert-butylacrylamide, and also basic (meth)acrylamides, e.g. dimethylaminoethylacrylamide, dimethylaminoethylmethacrylamide, diethylaminoethylacrylamide, diethylaminoethylmethacrylamide, dimethylaminopropylacrylamide, diethylaminopropylacrylamide, dimethylaminopropylmethacrylamide, and diethylaminopropylmethacrylamide.

Other suitable comonomers B are: N-vinylpyrrolidone, N-vinylcaprolactam, acrylonitrile, methacrylonitrile, N-vinylimidazole, and also substituted N-vinylimidazoles, such as N-vinyl-2-methylimidazole, N-vinyl-4-methylimidazole, N-vinyl-5-methylimidazole, and N-vinyl-2-ethylimidazole, and N-vinylimidazolines, e.g. vinylimidazoline, N-vinyl-2-methylimidazoline, and N-vinyl-2-ethylimidazoline. N-Vinylimidazoles and N-vinylimidazolines are used not only in the form of the free bases but also in a form neutralized with mineral acids or with organic acids, or in quaternized form, preferably quaternized with dimethyl sulfate, diethyl sulfate, methyl chloride, or benzyl chloride.

Other comonomers B which may be used are monomers containing sulfo groups, for example vinylsulfonic acid, allylsulfonic acid, methallylsulfonic acid, styrenesulfonic acid, the alkali metal or ammonium salts of these acids, and 3-sulfopropyl acrylate.

The polyvinylamines also encompass terpolymers and those polymers which additionally contain at least one other monomer incorporated into the polymer.

The copolymers contain, for example, from 99 to 1 mol % of monomers A, and
from 1 to 99 mol % of comonomers B.

To prepare copolymers containing vinylamine units it is preferable to start with homopolymers of N-vinylformamide or with copolymers which contain, incorporated into the polymer, N-vinylformamide, and
vinyl formate, vinyl acetate, vinyl propionate, acrylonitrile, or N-vinylpyrrolidone.

The acids, bases, or enzymes are used to convert the polymers described above into polyvinylamines, eliminating the carboxylic acid radicals from the monomers A incorporated into the polymer, to form N-vinylamine units incorporated into the polymer.

The extent of hydrolysis of the homopolymers of the monomers A and of their copolymers with the monomers B may be from 0.1 to 100 mol %, preferably from 10 to 100 mol %. In most cases the degree of hydrolysis of the homo- and copolymers is from 50 to 99 mol %. The degree of hydrolysis of the polymers is equivalent to the content of vinylamine units in the polyvinylamines. In the case of copolymers which contain vinyl esters incorporated into the polymer, hydrolysis of the ester groups can occur to form vinyl alcohol units, alongside hydrolysis of the N-vinylformamide units. This is particularly the case when the hydrolysis of the copolymers is carried out in the presence of sodium hydroxide solution. Acrylonitrile incorporated into the polymer is likewise chemically altered during the hydrolysis, producing, for example, amide groups or carboxyl groups.

According to the invention, it is preferable for the alkoxylated polyvinylamines to derive from polyvinylamines with a K value in the range from 10 to 200, preferably from 20 to 100. The K values are determined by the method of H. Fikentscher in 5% strength aqueous sodium chloride solution at pH 7, at 25° C., with a polymer concentration of 0.5% by weight, cf. Cellulose-Chemie, Vol. 13, 58-64 and 71-74 (1932).

According to the invention, use is made of alkoxylated polyvinylamines. These are obtained by reaction of epoxides of the formula II

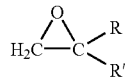

(II)

with polymers containing vinylamine units, where R is as defined for $R^1$, and R' is as defined for $R^2$, particularly as defined in the preferred meanings. Side chains of the formula I form here on the amino groups of the vinylamine units of the polyvinylamine, m being as defined above and n being 0. Subsequent reaction of. the resultant primary alkoxylation products with ethylene oxide and/or propylene oxide leads to the build-up of side chains of the formula I where n>0.

Examples of preferred epoxides II are the epoxides of 1-butene (R=ethyl; butylene oxide), of 1-pentene (R=propyl), of 1-hexene (R=n-butyl), of styrene (R=phenyl), and of butadiene (R=vinyl).

Other alkoxylated polyvinylamines suitable according to the invention are those where some or all of the amino groups of the vinylamine units of the polyvinylamine have side chains of the formula I. It is possible here for a primary amino function to have either one or else two side chains of the formula I. To describe the alkoxylated polyvinylamines hereinafter, therefore, reference is made to the value $\overline{m}$ of the variables m in the side chains, averaged over the number of amino groups in the polyvinylamine. The average value $\overline{m}$ is defined as the quotient calculated from the total of m in formula I for all of the side chains, divided by the total number of vinylamine units in the polyvinylamine. An average value $\overline{m}=1$ therefore means that 100 mol %, i.e. on average all of the amino groups of the vinylamine units in the polyvinylamine, bear a side chain of formula I where m=1. The average value $\overline{m}$ therefore corresponds to the number of epoxides of the formula II used per vinylamine unit. The average value $\overline{n}$, averaged over the number of amino groups in the polyvinylamine, is defined in the same way.

At least 10 mol % of the vinylamine units in the alkoxylated polyamines generally have a side chain of the formula I, where m is at least 1. Correspondingly, the average value $\overline{m}$ is generally at least 0.1. The average value $\overline{m}$ is preferably at least 0.5, i.e. on average at least 50% of the vinylamine units have a side chain of the formula I, where m≧1.

Particular preference is given to alkoxylated polyvinylamines here the value $\overline{m}$ of the variables m in the side chain of the formula I, averaged over the number of amino groups in the polyvinylamine, is at least 1, preferably at least 1.1, in particular at least 1.2, particularly preferably at least 1.4, and very particularly preferably at least 1.5. The average value $\overline{m}$ generally will not exceed 50, preferably 10, particularly preferably 8, and in particular 6.

The average value $\overline{n}$ may be 0 or else a value >0, e.g. a value up to $\overline{n}=100$. If $\overline{n}\ne 0$, its value will generally be in the range from 0.1 to 100, preferably from 1 to 100, and in particular in the range from 5 to 50.

Alkoxylated polyvinylamines where $\overline{n}=0$ and $\overline{m}<0.95$ are known from WO 97/42229, which is expressly incorporated herein by way of reference. The alkoxylated polyvinylamines preferred according to the invention, where m is at least 1, are novel and likewise provided by the present invention.

The alkoxylated polyvinylamines where $\overline{m}\ge 1$ are prepared by reacting the polyvinylamines described above with an epoxide of the formula II in the stoichiometric ratio desired in each case, i.e. in the case of $\overline{m}\ge 1$ with at least 1 mol of epoxide per mole of amino groups in the polyvinylamine.

The reaction of the polyvinylamine with the epoxide II generally takes place at above 70° C. in a solvent or diluent. The reaction is preferably carried out in a solvent. Suitable solvents, besides water, are $C_1$-$C_4$ alkanols, tetrahydrofuran, dioxane, dimethylformamide, and mixtures of these. Use may also be made of solvents immiscible with water, for example aliphatic or aromatic hydrocarbons, such as hexane, cyclohexane, toluene, xylenes, and similar solvents. In one preferred embodiment of this first alkoxylation stage, use is made of an aqueous solution of the polyvinylamine in a mixture with one of the above-mentioned, water-immiscible organic solvents.

The reaction temperature in the first stage of the reaction is generally above 70° C., preferably from 70 to 150° C. and in particular from 75 to 110° C.

The reaction may take place in the reactors usually used for this purpose. In the case of volatile starting materials, such as butylene oxide, or in the case of reaction temperatures above 100° C.,it is preferable to operate in closed reaction vessels. There is no requirement in principle to apply superatmospheric pressure, but this may be advantageous for reacting volatile components. The reaction pressure may be up to 50 bar, preferably up to 10 bar.

For the reaction of the polyvinylamine with the epoxide II it is preferable to use a polyvinylamine solution, with preference an aqueous polyvinylamine solution, which is substantially free from salts. For the purposes of the present invention, this means that the salt content, based on the polyvinylamine present in the solution, is less than 10% by weight, in particular less than 1% by weight. The salts usually present in the polyvinylamine solutions come from the preparation of the polyvinylamines by hydrolysis of the corresponding poly-N-vinylamides. It has proven particularly useful for the polyvinylamine solution to be free from formate. The salts, in particular the formate, are removed in a known manner, for example by dialysis or membrane filtration, from the aqueous polyvinylamine solutions produced during hydrolysis of the corresponding poly-N-vinylamides.

If desired, the alkoxylation product obtained during the reaction of polyvinylamine with the epoxides II may be reacted in a second stage with ethylene oxide, propylene oxide, and/or a mixture of these. In principle, the reaction may take place in the reaction mixture produced from polyvinylamine and epoxide II. A method which has proven successful here is to remove, in advance, any water present in the reaction mixture. One way of removing the water is by azeotropic distillation, in particular by azeotropic distillation with one of the abovementioned non-polar, water-immiscible solvents, such as an alkylbenzene, e.g., toluene or xylene, or an aliphatic hydrocarbon, e.g. hexane or cyclohexane.

A method which has proven particularly successful is to carry out the first stage in an organic, water-immiscible solvent suitable for azeotropic distillation with water. Using this method, water coming from the aqueous polyvinylamine solution can be removed in a simple manner by azeotropic distillation following the first stage of the reaction, before the reaction with ethylene oxide/propylene oxide is carried out.

The reaction with ethylene oxide and/or propylene oxide in the second stage generally takes place via addition of the appropriate oxirane to a preferably anhydrous solution of the alkoxylation product from the first stage. The addition here of the appropriate oxirane may take place in a single portion or over a period, which may be from some minutes to a number of hours. The temperature for the reaction with the oxirane is generally above 80° C., and in particular in the range from 100 to 250° C., and particularly in the range from 120 to 200° C.

The reaction with the oxirane is preferably carried out in the presence of a base. Bases which have proven particularly successful are those capable of at least some degree of abstraction of an alcoholic OH proton. Examples of suitable bases are alkali metal carbonates, such as sodium carbonate or potassium carbonate, alkali metal hydroxides and alkaline earth metal hydroxides, such as sodium hydroxide, potassium hydroxide, and calcium hydroxide, alkali metal alkoxides, such as sodium methoxide and sodium ethoxide, and also sodium hydride and calcium hydride. Preferred bases are the alkali metal hydroxides, and in particular sodium hydroxide.

In one preferred version of the process of the invention, the base is added to a solution of the alkoxylation product from the first stage in a water-immiscible solvent suitable for azeotropic distillation of water. The temperature is then increased to a point at which the solvent begins to distill off together with the water. The temperatures required for this are generally above 100° C., preferably from 120 to 200° C. This method has proven particularly successful if alkali metal hydroxides are used as base, since this method also separates off the water formed in the base reaction. The oxirane is then added, and the reaction mixture is allowed to continue reacting under the pressure which the mixture itself generates, preferably until the pressure is constant.

In order to work up the alkoxylated polyvinylamine obtained during the reaction with ethylene oxide/propylene oxide, the organic solvent is generally removed and replaced by water. This gives aqueous solutions of the desired alkoxylated polyvinylamines, which may be used directly in the application of the invention. It is, of course, also possible to isolate the alkoxylated polyvinylamines of the invention as a solid, by removing the volatile reaction constituents.

The alkoxylated polyvinylamines obtained by the process of the invention naturally have side chains of the formula I, where $\overline{m}$ is at least 1, and in particular has the preferred values given. Depending on the conduct of the reaction, n is within the ranges given above. The products obtained according to the invention in particular have a low proportion of byproducts, such as polyalkylene oxides, e.g. polyethylene oxide or polypropylene oxide.

Depending on their degree of alkoxylation, the alkoxylated polyvinylamines of the invention have molecular weights $M_w$ (determined by light scattering) of from 1000 to 10 000 000, preferably from 10 000 to 2 000 000. The K values of the alkoxylated polyvinylamines of the invention are in the range from 20 to 300, preferably in the range from 30 to 200. The K values were determined by the method of H. Fikentscher in 5% strength by weight aqueous sodium chloride solution at pH 7, at 25° C., and at a polymer concentration of 0.5% by weight (cf. above).

The structures used according to the invention preferably encompass at least one natural or synthetic polymeric material.

Examples of materials of this type are:

1. Polymers of mono- and diolefins, for example polypropylene, polyisobutylene, poly-1-butene, poly-4-methyl-1-pentene, polyisoprene, and polybutadiene, and also polymers of cycloolefins, e.g. of cyclopentene or norbornene; also polyethylene (which may, where appropriate, have been crosslinked), e.g. high-density polyethylene (HDPE), high-density high-molecular-weight polyethylene (HDPE-HMW), high-density ultra high-molecular-weight polyethylene (HDPE-UHMW), medium-density polyethylene (MDPE), low-density polyethylene (LDPE), linear low-density polyethylene (LLDPE), and branched low-density polyethylene (VLDPE).

Polyolefins, i.e. the monoolefin polymers mentioned by way of example in the paragraph above, in particular polyethylene and polypropylene, may be prepared by various processes, in particular free-radical processes, or by way of a catalyst, the catalyst usually comprising one or more metals of group IVb, Vb, VIb, or VIII. These catalyst systems are usually termed Phillips, Standard Oil Indiana, Ziegler(-Natta), TNZ (DuPont), metallocene, or single-site catalysts (SSC).

2. Mixtures of the polymers mentioned in 1., e.g. mixtures of polypropylene with polyisobutylene, polypropylene with polyethylene (e.g. PP/HDPE, PP/LDPE), and mixtures of different polyethylene grades (e.g. LDPE/HDPE).

3. Copolymers of mono- and diolefins with one another or with other vinyl monomers, e.g. ethylene-propylene copolymers, linear low-density polyethylene (LLDPE), and mixtures of the same with low-density polyethylene (LDPE), propylene-1-butene copolymers, propylene-isobutylene copolymers, ethylene-1-butene copolymers, ethylene-hexene copolymers, ethylene-methylpentene copolymers, ethylene-heptene copolymers, ethylene-octene copolymers, propylene-butadiene copolymers, isobutylene-isoprene copolymers, ethylene-alkyl acrylate copolymers, ethylene-alkyl methacrylate copolymers, ethylene-vinyl acetate copolymers and copolymers of these with carbon monoxide, and ethylene-acrylic acid copolymers and salts of these (ionomers), and also terpolymers of ethylene with propylene and with a diene, such as hexadiene, dicyclopentadiene, or ethylidenenorbornene; also mixtures of these copolymers with one another, or with polymers mentioned in 1., e.g. polypropylene/ethylene-propylene copolymers, LDPE/ethylene-vinyl acetate copolymers, LDPE/ethylene-acrylic acid copolymers, LLDPE/ethylene-vinyl acetate copolymers, LLDPE/ethylene-acrylic acid copolymers, and alternating-structure or random-structure polyalkylene-carbon monoxide copolymers, and mixtures of these with other polymers, e.g. with polyamides.

4. Hydrocarbon resins, including hydrogenated modifications of these (e.g. tackifier resins), and mixtures of polyalkylenes and starch.

5. Polystyrene, poly(p-methylstyrene), poly(α-methylstyrene).

6. Copolymers of styrene or α-methylstyrene with dienes or with acrylic derivatives, e.g. styrene-butadiene, styrene-acrylonitrile, styrene-alkyl methacrylate, styrene-butadiene-alkyl acrylate, styrene-butadiene-alkyl methacrylate, styrene-maleic anhydride, styrene-acrylonitrile-methyl acrylate; mixtures with high impact strength made from styrene copolymers with another polymer, e.g. with a polyacrylate, with a diene polymer, or with an ethylene-propylene-diene terpolymer; and block copolymers of styrene, e.g. styrene-butadiene-styrene, styrene-isoprene-styrene, styrene-ethylene/butylene-styrene, and styrene-ethylene/propylene-styrene.
7. Graft copolymers of styrene or α-methylstyrene, e.g. styrene on polybutadiene, styrene on polybutadiene-styrene copolymers, styrene on polybutadiene-acrylonitrile copolymers, styrene and acrylonitrile (and, respectively, methacrylonitrile) on polybutadiene; styrene, acrylonitrile, and methyl methacrylate on polybutadiene; styrene and maleic anhydride on polybutadiene; styrene, acrylonitrile, and maleic anhydride or maleimide on polybutadiene; styrene and maleimide on polybutadiene, styrene and alkyl acrylates and, respectively, alkyl methacrylates on polybutadiene, styrene and acrylonitrile on ethylene-propylene-diene terpolymers, styrene and acrylonitrile on polyalkyl acrylates or on polyalkyl methacrylates, styrene and acrylonitrile on acrylate-butadiene copolymers, and also mixtures of these with the copolymers mentioned in 6., e.g. those known as ABS polymers, MBS polymers, ASA polymers, or AES polymers.
8. Halogen-containing polymers, e.g. polychloroprene, chlorinated rubber, chlorinated and brominated isobutylene-isoprene copolymer (halobutyl rubber), chlorinated or chlorosulfonated polyethylene, copolymers of ethylene with chlorinated ethylene, epichlorohydrin homo- and copolymers, and in particular polymers of halogen-containing vinyl compounds, e.g. polyvinyl chloride, polyvinylidene chloride, polyvinyl fluoride, polyvinylidene fluoride; and copolymers of these, such as vinyl chloride-vinylidene chloride, vinyl chloride-vinyl acetate, and vinylidene chloride-vinyl acetate.
9. Polymers derived from α,β-unsaturated acids or from derivatives of these, for example polyacrylates and polymethacrylates, butyl-acrylate-impact-modified polymethyl methacrylates, polyacrylamides, and polyacrylonitriles.
10. Copolymers of the monomers mentioned in 9. with one another or with other unsaturated monomers, e.g. acrylonitrile-butadiene copolymers, acrylonitrile-alkyl acrylate copolymers, acrylonitrile-alkoxyalkyl acrylate copolymers, acrylonitrile-vinyl halide copolymers, and acrylonitrile-alkyl methacrylate-butadiene terpolymers.
11. Polymers derived from unsaturated alcohols or amines and, respectively, their acyl derivatives or acetals, for example polyvinyl alcohol, polyvinyl acetate, polyvinyl stearate, polyvinyl benzoate, polyvinyl maleate, polyvinyl butyral, polyallyl phthalate, polyallylmelamine; and copolymers of these with olefins mentioned in 1.
12. Homo- and copolymers of cyclic ethers, for example polyalkylene glycols, polyethylene oxide, polypropylene oxide, and copolymers of these with bisglycidyl ethers.
13. Polyacetals, such as polyoxymethylene, and polyoxymethylenes which contain comonomers, e.g. ethylene oxide; polyacetals modified with thermoplastic polyurethanes, with acrylates, or with MBS.
14. Polyphenylene oxides and polyphenylene sulfides, and mixtures of these with styrene polymers or with polyamides.
15. Polyurethanes derived, on the one hand, from polyethers, polyesters, or polybutadienes having terminal hydroxyl groups and, on the other hand, from aliphatic or aromatic polyisocyanates, and also precursors of these polyurethanes.
16. Polyamides and copolyamides derived from diamines and dicarboxylic acids, and/or from aminocarboxylic acids, or from the corresponding lactams, for example nylon-4, nylon-6, nylon-6,6, -6,10, -6,9, -6,12, -4,6, -12, 12, -11, and -12, aromatic polyamides, e.g. those based on p-phenylenediamine and adipic acid; polyamides prepared from hexamethylenediamine and iso- and/or terephthalic acid and, where appropriate, an elastomer as modifier, e.g. poly-2,4,4-trimethylhexamethyleneterephthalamide or poly-m-phenyleneisophthalamide. Other suitable polymers are block copolymers of the abovementioned polyamides with polyolefins, with olefin copolymers, with ionomers, or with chemically bonded or grafted elastomers; or with polyethers, e.g. with polyethylene glycol, polypropylene glycol, or polytetramethylene glycol. EPDM- or ABS-modified polyamides or copolyamides are also suitable, as are polyamides condensed during processing ("RIM polyamide systems").
17. Polyureas, polyimides, polyamide imides, polyetherimides, polyesterimides, polyhydantoins, and polybenzimidazoles. cellulose ethers, such as methylcellulose; and colophony resins and derivatives.
28. Binary or multiple mixtures (polymer blends) of the abovementioned polymers are also very generally suitable, e.g. PP/EPDM, nylon/EPDM or ABS, PVC/EVA, PVC/ABS, PVC/MBS, PC/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/nylon-6,6 and copolymers, PA/HDPE, PA/PP, PA/PPO, PBT/PC/ABS, and PBT/PET/PC.

Preference is given to those particulate, linear, sheet-like or three-dimensional structures which encompass at least one polymeric material selected from the group consisting of polyolefins, polyesters, polyamides, polyacrylonitrile, polyaromatics, styrene-acrylonitrile copolymers (SAN), acrylonitrile-butadiene-styrene copolymers (ABS), polyurethanes, and mixtures (polymer blends) of the abovementioned polymers.

Preferred structures used according to the invention are synthetic fibers, particularly made from polyolefins, such as polyethylene or polypropylene, polyesters, polyacrylonitrile, or polyamides, e.g. nylon-6 or nylon-6,6.

Preferred structures used according to the invention are sheet-like structures, and in particular films or foils. These preferably encompass a polymer selected from the group consisting of polyolefins, such as polyethylene and/or polypropylene, polymers of halogenated monomers, e.g. polyvinyl chloride and/or polytetrafluoroethylene, polyesters and mixtures of these.

Another preferred structure used according to the invention is a molding. This preferably encompasses at least one polymeric material selected from the group consisting of polyolefins, e.g. polyethylene and/or polypropylene, polyaromatics, such as polystyrene, polymers of halogenated monomers, for example polyvinyl chloride and/or polytetrafluoroethylene, polyesters, polyacrylonitrile, styrene-acrylonitrile copolymers, acrylonitrile-butadiene-styrene copolymers, polyamides, such as nylon-6 and/or nylon-6,6, polyurethanes and mixtures of these.

The polymers may be used in mixtures or in combination with surface-active substances, e.g. anionic, nonionic, or cationic surfactants or, respectively, wetting agents. They may also be used in a mixture with other polymers, and in some circumstances 18. Polyesters which derive from dicarboxylic acids and dialcohols and/or from hydroxycarboxylic acids, or from the corresponding lactones, for example polyethylene terephthalate, polybutylene terephthalate, poly-1,4-dimethylolcyclohexane terephthalate, polyhydroxybenzoates, and also block polyetheresters which derive from polyethers having hydroxyl end groups; and polyesters modified with polycarbonates or with MBS.
19. Polycarbonates and polyester carbonates.
20. Polysulfones, polyether sulfones, and polyether ketones.
21. Crosslinked polymers which derive from aldehydes on the one hand and from phenols, urea or melamine on the other, for example phenol-formaldehyde resins, urea-formaldehyde resins, and melamine-formaldehyde resins.
22. Drying and nondrying alkyd resins.
23. Unsaturated polyester resins which derive from copolyesters of saturated or unsaturated dicarboxylic acids with polyhydric alcohols, and also vinyl compounds as crosslinkers, and also halogen-containing, flame-retardant modifications of these.
24. Crosslinkable acrylic resins which derive from substituted acrylic esters, e.g. from epoxyacrylates, from urethane acrylates, or from polyester acrylates.
25. Alkyd resins, polyester resins, and acrylate resins which have been crosslinked by melamine resins, by urea resins, by isocyanates, by isocyanurates, by polyisocyanates, or by epoxy resins.
26. Crosslinked epoxy resins which derive from aliphatic, cycloaliphatic, heterocyclic, or aromatic glycidyl compounds, e.g. products of bisphenol A diglycidyl ethers or of bisphenol F diglycidyl ethers, which are crosslinked by way of conventional hardeners, e.g. anhydrides or amines, with or without accelerators.
27. Natural polymers, such as cellulose, natural rubber, gelatine, and also their polymer-homologous chemically modified derivatives, for example cellulose acetates, cellulose propionates, and cellulose butyrates and the this can also achieve an increase in the surface-modifying effect.

The polymers used according to the invention are advantageously suitable for modifying the surface properties of particulate, linear, sheet-like, or three-dimensional structures. For the purposes of the present invention, the expression "modifying the surface properties" is interpreted widely. This includes especially hydrophilicization, which for the purposes of the present invention is generally an increase in the wettability with water or with an aqueous liquid. Increased wettability is usually attended by more rapid and/or increased absorption of liquid and/or by improved retention of liquid, generally also under superatmospheric pressure. However, according to the invention "modifying of surfaces" also includes an improvement in adhesion, an improved antistatic effect, an anti-deposition effect, improved properties for the wearer, e.g. in the case of sanitary products, and/or improved hand.

The structures of the invention are generally advantageously suitable for any application sector where water or aqueous liquids come into contact with materials which in their unmodified state are substantively hydrophobic. Particularly relevant factors here are the rapid absorption and/or the rapid transport of water into materials which are in themselves hydrophobic. The structures of the invention may moreover generally be used advantageously wherever modifying surfaces by hydrophilicization can achieve improved adhesion properties, improved antistatic properties, improved anti-deposition properties, improved hand and/or improved wearer comfort.

The structures of the invention are advantageously suitable in or as synthetic fibers, wovens, knits, nonwovens, felts, textile composites, e.g. carpets, bonded or laminated textiles, etc. They are also advantageously suitable for use in diapers, sanitary pads, cloths for cleaning, wiping or dishwashing, and serviettes, agricultural textiles, geotextiles, and also for filter applications.

The alkoxylated polyvinylamines having side chains of the formula I, in particular the alkoxylated polyvinylamines of the invention where $\overline{m}$ is at least 1, are suitable as hydrophilicizing agents for the abovementioned materials, in particular for synthetic fibers, for example those made from polyethylene, polypropylene, polyesters, polyacrylonitrile, or from polyamides. The alkoxylated polyvinylamines are also suitable for improving the printability and adhesive bondability of sheeting or films, for example those made from polyethylene, polypropylene, polyvinyl chloride, polytetrafluoroethylene, or from polyesters.

The antistatic properties of sheeting or films can also be improved by using alkoxylated polyvinylamines having side chains of the formula I.

The use of alkoxylated polyvinylamines having side chains of the formula I in association with moldings also gives an improvement in surface properties, making these more printable or more adhesive-bondable and giving them better antistatic properties. Examples of typical moldings are those made from polyethylene, polypropylene, polystyrene, polyvinyl chloride, polytetrafluoroethylene, polyesters, polyacrylonitrile, styrene-acrylonitrile copolymers (SAN), acrylonitrile-butadiene-styrene terpolymers (ABS), polyamides, such as nylon-6 or nylon-6,6, or from polyurethanes and/or mixtures of the abovementioned plastics.

The use of alkoxylated polyvinylamines having side chains of the formula I also leads to an improvement in the surface conductivity of hydrophobic, non-conducting materials, in particular of the abovementioned plastics, and thus improves their antistatic properties. The alkoxylated polyvinylamines having side chains of the formula I are also suitable for reducing the susceptibility of plastic films to deposition.

Another advantage of the agents of the invention compared with known hydrophilicizing agents is that they do not lead to any significant reduction in the surface tension of water.

The processes used to equip the particulate, linear, sheet-like or three-dimensional structures of the invention with the alkoxylated polyvinylamines having side chains of the formula I may be those usually used to hydrophilicize the above-mentioned structures with hydrophilicizing agents of the prior art. To this end, the structure is usually treated with a dilute, preferably aqueous solution of the alkoxylated polyamine in a manner usual for the nature of the structure, e.g. by rinsing, dipping, spraying, padding, or similar methods as usually used for treating textiles or films. The content of alkoxylated polyvinylamines having side chains of the formula I in the solution is generally in the range from at least 0.01 to 20% by weight, and preferably from 0.05 to 15% by weight and in particular from 0.1 to 10% by weight, based on the weight of the solution. It is preferable to use aqueous solutions of the alkoxylated polyamines for the treatment. The alkoxylated polyvinylamine with side chains of the Formula I is absorbed by the surface, in the amount required for hydrophilicization, and this amount remains adhering to the surface after drying. The amounts required to achieve effective hydrophilicization are reached automatically and are extremely small. For structures with a smooth surface, such as films or similar structures, as little as 0.1 mg/m$^2$ of alkoxylated polyvinylamine is sufficient.

In another embodiment of the process of the invention for hydrophilicizing surfaces, the alkoxylated polyvinylamine may also be added to the material of which the structure is composed and the structure may then be produced from this.

For example, when treating thermoplastics, the alkoxylated polyvinylamine in the form of a solid may be compounded with the plastic. The resultant treated plastic is then further processed by conventional processes to give films, for example by extrusion, or to give fiber materials, for example by a melt spinning process.

The ease of use of the alkoxylated polyvinylamines used according to the invention permits their use in many application sectors, for example as hydrophilicizing agents for nonwovens used in diapers, sanitary pads, agricultural textiles, geotextiles, other textiles, or filter systems, for example. The synthetic fibers treated with alkoxylated polyvinylamines may themselves be further processed to give fabrics or textiles. The result is an improvement in water-vapor permeability and capillary transport of perspiration, and a reduction in soiling by a wide variety of hydrophobic types of dirt. In addition, there is a favorable effect on soil release properties. The alkoxylated polyvinylamines may also be used as an antistatic treatment for plastic films or silicon wafers.

A suitable measure for assessing the hydrophilic/hydrophobic nature of the surface of a particulate, linear, sheet-like or three-dimensional structure is the contact angle of water on the respective surface (see, for example, Römpp, Lexikon Chemie, 9th edition, p. 372 "Benetzung", Georg Thieme Verlag (1995). The term hydrophobic surfaces is usually used here if the contact angle of water is above 90°. The use of acylated polymeric polyamines brings about a reduction in the contact angle by at least 5°, preferably by at least 10°, compared with that of the unmodified hydrophobic surface.

It is advantageous that the structures of the invention do not show the unfavorable effects known from the prior art on the surface tension of aqueous solutions, nor any increased susceptibility to migration.

The polymers used according to the invention, and also the structures surface-modified with the same, have particularly good compatibility with polymer melts. They are therefore generally also suitable as additives to a melt of polymeric raw materials for fibers or for moldings. However, the polymers may also be used as agents for modifying the structures by post-treatment.

The invention is further illustrated by the following non-limiting examples:

I. TEST METHODS

I.1 Angle of Contact Measurement

The respective substrate is treated, with stirring, with a 0.5% strength by weight solution of the alkoxylated polyvinylamine for 30 min at 21° C. The specimen is divided up, and one half is dried immediately after treatment (CA1), while the other half is dipped in distilled water for about one second and then dried (CA2). The contact angle on both specimens is determined using distilled water at room temperature.

I.2 Measurement of Hydrophilic Properties

The test was carried out on a polypropylene web. The web is treated with a 0.5% strength by weight solution of the alkoxylated polyamine, and then dried. A drop of water is placed upon the substrate to be tested. The wetting of the web by the water is assessed visually, by way of a scale of points from 1 to 10. 0 points here means no wetting, and 10 points means immediate run-out of the drop.

I.3 Reflectometric determination of affinity

As described by J. C. Dijt et al., Colloids Surf. 51 (1990) 141, a polypropylene film which was applied to a silicon wafer was brought into contact with an aqueous polymer solution at a concentration of 0.05% by weight. The amount adsorbed can be determined in situ by analyzing the direction of polarization of a reflected beam of light.

II. PREPARATION EXAMPLES

Example 1

Butoxylated Polyvinylamine ($\bar{m}=2$)

496.6 g of an aqueous polyvinylamine solution (K value=45; polymer content=8.3% by weight; number of amino groups per 100 g of solution=182.1 mmol/100 g; amino groups in batch N=0.904 mol) and 1300 g of xylene formed an initial charge in a 5 l metal reactor and were then inertized three times, each time using nitrogen at 5 bar. The contents of the reactor were heated to 90° C., and 130.2 g of butylene oxide were then metered in over a period of 120 minutes until the pressure reached was 5 bar. Stirring was then continued until the pressure was constant. After cooling the reactor and releasing its pressure, the butoxylated polyvinylamine mixture obtained had an average degree of butoxylation $\bar{m}$ of 2.

Example 2

Butoxylated and Ethoxylated Polyvinylamine ($\bar{m}=2$, $\bar{m}=12$)

A butoxylated polyvinylamine was prepared by a method based on the preparation specification of Example 1, and the contents of the reactor were cooled to 50° C. after the butoxylation and then inertized three times by introducing nitrogen at 5 bar. 5.4 g of NaOH were then added, the temperature raised in stages as far as a jacket temperature of 170° C., and the water present was removed. The stirring of the reaction mixture was then continued at reflux for a total of 5 hours. 200 g of ethylene oxide were then metered in at an internal temperature of 150° C., and the temperature was then increased to 160° C. and a further 277.8 g of ethylene oxide added. Stirring was continued until the pressure was constant, and the reactor was then cooled to 100° C. and the reactor discharge transferred into a 4 l four-necked flask. Most of the xylene was then first removed at reduced pressure on a rotary evaporator. About 4 l of steam was then passed through the reaction mixture at a temperature of from 95 to 103° C., with stirring. Finally, the product was freed from remaining solvents by distillation. This gave a butoxylated and ethoxylated polyvinylamine ($\bar{m}=2$, $\bar{n}=12$).

Example 3

Product from Reaction of Polyvinylamine with Styrene Oxide and Ethylene Oxide ($\bar{m}=2$, $\bar{n}=40$)

496.6 g of a polyvinylamine solution of Example 1 and 1300 g of xylene formed an initial charge in a 5 l metal reactor, and the reactor was inertized by three introductions of nitrogen gas at 5 bar. The temperature was then increased to 90° C., and 224.2 g of styrene oxide were metered in over a period of 120 minutes until the pressure reached was 5 bar. Stirring of the mixture was then continued until the pressure had become constant. The reactor was cooled to 50° C. and inertized three times introducing nitrogen, each time at a pressure of 5 bar. 5.4 g of NaOH were then added, and the temperature was increased in stages until a jacket temperature of 170° C. had been reached. The reaction mixture was freed from water and stirring of the reaction mixture was continued for a further 5 hours at reflux. The temperature was then increased to an internal temperature of 150° C., and 300 g of ethylene oxide were metered in. After a further increase in temperature to an internal temperature of 160° C., 1286.8 g of ethylene oxide were metered in and the stirring of the reaction mixture was again continued until the pressure was constant. The mixture was then cooled to 100° C., and the reactor discharge was transferred into a 4 l four-necked flask. Most of the xylene was removed at reduced pressure on a rotary evaporator, and about 4 l of steam was then passed through the mixture at from 95 to 103° C. Remaining solvents were finally removed by distillation. This gave a product from the reaction of polyvinylamine with styrene oxide and ethylene oxide ($\bar{m}$=2, $\bar{n}$=40).

III. PERFORMANCE-RELATED EXAMPLES

III.1 Measurement of contact angle and surface tension

The contact angle was measured as described above. Surface tension was measured on 0.1% strength by weight solutions in water at 23° C. to DIN 53914. The results are given in Table 1 below.

TABLE 1

| Example No. | Additive | Contact angle CA 1 | Surface tension (0.1% of additive in water at 23° C. to DIN 53914) |
|---|---|---|---|
| 4 (Comparison) | no additive | 105° | 72 mN/m (pure water) |
| 5 (Comparison) | commercially available alcohol ethoxylate | 58° | 29 mN/m |
| 6 (Comparison) | commercially available hydrophilicizing polyetherester | 86° | not measured |
| 7 | Example 1 | 7° | 64 mN/m |
| 8 | Example 2 | 10° | 60 mN/m |
| 9 | Example 3 | 8° | 65 mN/m |

For the polymers of the invention there is no significant difference between the CA 2 values and the CA 1 values. This shows that the hydrophilicizing effect continues even after rinsing with water.

III.2: Measurement of Hydrophilic Properties

Hydrophilic properties were measured as described above. The results are given in Table 2 below.

TABLE 2

| Example No. | Additive | Hydrophilic properties |
|---|---|---|
| 10 (Comparison) | no additive | 0 |
| 11 (Comparison) | commercially available hydrophilicizing polyether ester | 3 |
| 12 | Example 1 | 8 |

TABLE 2-continued

| Example No. | Additive | Hydrophilic properties |
|---|---|---|
| 13 | Example 2 | 9 |
| 14 | Example 3 | 8 |

III.3: Determination of Affinity

Example 15

A 0.05% strength by weight solution of the butoxylated polyvinylamine from Example 1 was adjusted to pH 5. A polypropylene-modified silicon wafer was then subjected to a perpendicular flow of the resultant solution at 0.7 ml/min, at room temperature. In comparison with a polymer-free solution, a change in the detection signal was observed due to absorption of the polymer. Using computer-assisted jet modeling, this change gives a coating weight of 0.8 mg/m². This coating weight shows no significant reduction if the surface is then subjected to a flow of polymer-free solution.

The performance-related examples show that polypropylene surfaces can be effectively hydrophilicized by the alkoxylated polyvinylamines of the invention or used according to the invention. None of the examples of the invention here reveals any significant foaming tendency, whereas the commercially available alcohol ethoxylate used as comparative substance shows severe to very severe foaming tendency, as do the customary nonionic surfactants known from the prior art. In addition, when the alkoxylated polyvinylamines are used no significant reduction in surface tension of an aqueous solution is found, whereas the alcohol ethoxylate used as comparative substance markedly reduces surface tension, as do very generally the surfactants known from the prior art and used as hydrophilicizing agents.

We claim:

1. A particulate structure, linear structure, sheet or three-dimensional structure, comprising:
a particulate structure, linear structure, sheet or three-dimensional structure having a hydrophobic surface which is hydrophilized by treatment with at least on its surface, a hydrophilicizing amount of at least one alkoxylated polyvinylamine, where at least some of the polyvinylamine nitrogen atoms bear radicals of the formula I:

(I)

where $R^1$, $R^2$, $R^3$, m, and n are as follows:
$R^1$ is $C_2$-$C_{28}$-alkyl, $C_2$-$C_{28}$-alkenyl, $C_6$-$C_{16}$-aryl, or $C_7$-$C_{16}$-arylalkyl,
$R^2$ is hydrogen or methyl,
$R^3$ is hydrogen or methyl,
m is an integer from 1 to 20, and
n is 0 or an integer from 1 to 100, and where the value $\bar{n}$ of the variable n in the side chains of formula I, averaged over the number of amino groups in the polyvinylamine, is in the range from 0.1 to 100.

2. The particulate structure, linear structure, sheet or three-dimensional structure as claimed in claim 1, where the value $\bar{m}$ of the variable m in the side chains of formula I, averaged over the number of amino groups in the polyvinylamine, is at least 1.

3. The particulate structure, linear structure, sheet or three-dimensional structure as claimed in claim 1, where $R^1$ in formula I is a $C_2$-$C_8$-alkyl or phenyl or $C_2$-$C_8$-alkyl or phenyl substituted with one or two $C_1$-$C_4$-alkyl groups.

4. The particulate structure, linear structure, sheet or three-dimensional structure as claimed in claim 1, which is in the form of a linear or sheet-like textile structure.

5. The particulate structure, linear structure, sheet or three-dimensional structure as claimed in claim 4, wherein the textile structure is formed from synthetic fibers.

6. The particulate structure, linear structure, sheet or three-dimensional structure as claimed in claim 1, which is in the form of a plastic film or of a plastic molding.

7. The particulate structure, linear structure, sheet or three-dimensional structure as claimed in claim 1, wherein said $C_2$-$C_{28}$-alkyl is ethyl, n-propyl, isopropyl, n-butyl, 1-methylpropyl, 2-methylpropyl, 1,1-dimethylethyl, n-pentyl, 1-methylbutyl, 2-methylbutyl, 3-methylbutyl, n-hexyl, n-octyl, ethylhexyl, 1,1,3,3-tetramethylbutyl, n-nonyl, n-decyl, n-undecyl, n-dodecyl, n-tridecyl, myristyl, pentadecyl, palmityl (cetyl), heptadecyl, octadecyl, nonadecyl, arachinyl, behenyl, lignocerenyl, cerotinyl or melissinyl.

8. The particulate structure, linear structure, sheet or three-dimensional structure as claimed in claim 1, wherein said $C_2$-$C_{28}$-alkenyl is vinyl, allyl, 1-methylvinyl, methallyl, 1-butenyl, octenyl, nonenyl, decenyl, undecenyl, dodecenyl, tridecenyl, tetradecenyl, pentadecenyl, hexadecenyl, heptadecenyl, octadecenyl, nonadecenyl, linolyl, hnolenyl or elaostearyl.

9. The particulate structure, linear structure, sheet or three-dimensional structure as claimed in claim 1, wherein said $C_6$-$C_{16}$-aryl is an aromatic radical having from 6 to 16 carbon atoms with one, two or three substituents selected from the group consisting of halogen, $C_1$-$C_4$-alkyl and $C_1$-$C_4$-alkoxy.

10. The particulate structure, linear structure, sheet or three-dimensional structure as claimed in claim 1, wherein the alkyl group of said $C_7$-$C_{16}$-arylalkyl has from 1, 2, 3, or 4 carbon atoms and the aryl group is an aromatic radical having from 6 to 16 carbon atoms.

11. An alkoxylated polyvinylamine, where at least some of the polyvinylamine nitrogen atoms bear radicals of the formula I

$$-(CH_2-CR^1R^2-O)_m-(CH_2-CHR^3-O)_nH \qquad (I)$$

where $R^1$, $R^2$, $R^3$, m, and n are as follows:
$R^1$ is $C_2$-$C_{28}$-alkyl, $C_2$-$C_{28}$-alkenyl, $C_6$-$C_{16}$-aryl, or $C_7$-$C_{16}$-arylalkyl,
$R^2$ is hydrogen or methyl,
$R^3$ is hydrogen or methyl,
m is an integer ranging from 1 to 20, and
n is 0 or an integer ranging from i to 100, and wherein the value $\overline{m}$ of the variable m in the side chains of formula I, averaged over the number of amino groups in the polyvinylamine, is at least 1.1, and wherein the value $\overline{n}$ of the variable n in the side chains of formula I, averaged over the number of amino groups in the polyvinylamine, is in the range from 0.1 to 100.

12. Amended) A structure having a hydrophobic surface which is hydrophilized by treatment with at least on its surface, a hydrophilicizing amount of at least one alkoxylated polyvinylamine, where at least some of the polyvinylamine nitrogen atoms bear radicals of the formula I:

$$-(CH_2-CR^1R^2-O)_m-(CH_2-CHR^3-O)_nH \qquad (I)$$

where $R^1$, $R^2$, $R^3$, m, and n are as follows:
$R^1$ is $C_2$-$C_{28}$-alkyl, $C_2$-$C_{28}$-alkenyl, $C_6$-$C_{16}$-aryl, or $C_7$-$C_{16}$-arylallcyl,
$R^2$ is hydrogen or methyl,
$R^3$ is hydrogen or methyl,
m is an integer from 1 to 20, and
n is 0 or an integer from 1 to 100, and where the value $\overline{n}$ of the variable n in the side chains of formula I, averaged over the number of amino groups in the polyvinylamine, is in the range from 0.1 to 100.

* * * * *